(12) United States Patent
Englander et al.

(10) Patent No.: US 6,296,162 B1
(45) Date of Patent: Oct. 2, 2001

(54) CYCLE CARRIER

(75) Inventors: Curt Englander, Hillerstorp; Andreas Arvidsson, Bodafors; Björn Eriksson, Bredaryd, all of (SE)

(73) Assignee: Industi AB Thule, Hillerstorp (SE)

( * ) Notice: Subject to any disclaimer, the term of this patent is extended or adjusted under 35 U.S.C. 154(b) by 0 days.

(21) Appl. No.: 09/328,827

(22) Filed: Jun. 9, 1999

(30) Foreign Application Priority Data

Jun. 18, 1998 (SE) .................................................. 9802180

(51) Int. Cl.⁷ ....................................................... B60R 9/00
(52) U.S. Cl. ........................... 224/324; 224/323; 224/570
(58) Field of Search ................................... 224/324, 323, 224/570; 248/316.4, 316.5, 316.6, 292.13

(56) References Cited

U.S. PATENT DOCUMENTS

| 2,316,995 | * | 4/1943 | Smith | 224/570 |
| 4,629,104 | | 12/1986 | Jacquet . | |
| 5,417,398 | * | 5/1995 | Schilling | 248/316.5 |
| 5,762,248 | * | 6/1998 | Englander et al. | 224/324 |

FOREIGN PATENT DOCUMENTS

| 3217319 | 5/1982 | (DE) . |
| 2460873 | 2/1980 | (FR) . |
| 9002669 | 3/1990 | (WO) . |
| 9507197 | 3/1995 | (WO) . |
| 9631367 | 10/1996 | (WO) . |

\* cited by examiner

*Primary Examiner*—Gene Mancene
*Assistant Examiner*—Maerena N. Brevard
(74) *Attorney, Agent, or Firm*—Kilpatrick Stockton LLP

(57) ABSTRACT

A cycle carrier that includes a gripping device (6) which engages with and fixedly retains a portion of a cycle. Further, the cycle carrier includes an operating device (7) with which the gripping device (6) is maneuvered between its closed and its open position. The gripping device (6) is openable against a spring pretensioning which, when it is released, transfers the gripping device (6) to an abutment position against the cycle. The abutment position is determined by the thickness of the fixedly held portion of the cycle. The operating device (7) includes means (15) for transferring the gripping device (6) to a clamping position. In the clamping position, the gripped portion of the cycle is fixedly clamped in the gripping device (6).

22 Claims, 8 Drawing Sheets

CYCLE CARRIER

RELATED PATENT APPLICATIONS

This patent application claims priority to Swedish patent application No. 9812180-1 filed Jun. 18, 1998. The full disclosure of said application in its entirety is hereby expressly incorporated by reference into the present application.

DESCRIPTION

1. Technical Field

The present invention relates to a cycle carrier which includes a gripping device for engagement with and positionally fixing retention of a portion of a cycle, and an operating device for maneuvering the gripping device between a closed position and an open position.

2. Background of the Invention

An infinite number of types and versions of cycle carriers for the transport of cycles on vehicles are previously known in the art. One type of such a cycle carrier is intended for placing on a load carrier or roof rack on a vehicle roof and includes a channel-shaped rail disposed in the longitudinal direction of the vehicle and in which the wheels of the cycle rest. The rail is secured on a pair of conventional load carrier struts by means of brackets. From the rail, or one of these brackets, a pivotal arm or yoke extends upwards which, in its upper end, has a gripping device for engagement with and positionally fixing retention of a portion of the frame of the cycle. The arm is arranged to be pivotal about a horizontal axis which is transverse in relation to the direction of travel of the vehicle, for which reason its upper end may be raised and lowered along an arc of a circle.

Cycle frames may vary considerably in appearance and also vary greatly in the dimensions of the frame tubes which make up the frame. As regards the adaptation of the position of the gripping device to a suitable engagement portion of the frame, this may be catered for by the above-mentioned pivotal action of the arm. The case is more serious for the gripping device, since this must be capable of cooperating with and fixedly retaining frame tubes which, in their slimmest version, may have circular cross sections with a diameter of the order of magnitude of 20–25 mm. However, the frame tubes may also have an oval or otherwise shaped cross section, with transverse dimensions of as much as 6–8 cm. Major problems have hitherto been encountered as regards the design of the gripping device which must be capable of cooperating with a broad spectrum of different dimensions and designs of the frame tubing.

WO 90/02669 discloses a cycle carrier of the above-considered type. In this cycle carrier, the gripping device is designed as a pair of tongs or scissors with reciprocally movable gripping jaws with recesses for enclosing the frame tube. In order, as far as is possible, to make the gripping device flexible as regards the dimensions and shape of the gripped frame tubes, the gripping device has slidable auxiliary jaws by means of which the shape and size of the gripping recess of the gripping jaws may be varied.

This construction functions well in certain contexts, but always requires an adjustment of the gripping device to suit the cycle frame in question. Thus, there is a risk that the user, out of carelessness or ignorance, makes no adjustment—or an incorrect adjustment—for which reason the cycle runs the risk of coming loose.

DE-AI-3217319 discloses a similar fundamental solution which also has a very limited field of use as regards different dimensions and shapes of the gripped frame tube of the cycle.

DISCLOSURE OF THE INVENTION

The present invention in its several disclosed embodiments alleviates the drawbacks described above with respect to conventionally designed cycle carriers and incorporates several additionally beneficial features. One object of the present invention is to provide a cycle carrier that may be used together with cycles that have greatly varying dimensions and shapes of the portion of the cycle which is to be gripped by the carrier. The present invention further has as an object to provide a cycle carrier which is self-adjusting in response to the dimensions and shape of the portion of the cycle to be gripped. Further, the present invention has as an object to provide a cycle carrier which is simple and convenient to operate and which is reliable in function.

The objects forming the basis of the present invention will be attained if the cycle carrier disclosed by way of introduction is characterized in that the gripping device is openable against a spring pretensioning, which, on release, is disposed to transfer the gripping device to an abutment position against a portion of the cycle inserted in the open gripping device, the abutment position being dependent upon the thickness of the gripped portion; and that the operating device includes means for transferring the gripping device to a clamping position where the gripped portion is positionally fixedly clamped in the gripping device regardless of where the abutment position was located.

In at least one embodiment, the present invention takes the form of a gripping arrangement to be implemented in a cycle carrier for positionally fixing a cycle for transport or storage. The gripping arrangement includes a gripping device that is disposed on a distal end of a pivot arm. The pivot arm is arranged to pivot between a stored position and a cycle gripping position. Usually, the cycle gripping position will be a raised orientation compared to a laid-down stored position, but the gripping position for a particular carrier will ultimately be determined by the configuration of the overall carrier and the vehicle or other object to which the carrier is mounted. The gripping device can assume what has been referred to herein as a cycle member abutting configuration which connotes an orientation in which the gripping device is just beginning to press upon a portion of a cycle, but typically before any substantial gripping pressure has been applied. Moreover, the gripping device is pretensioned toward this cycle member abutting configuration; exemplarily, by a spring or otherwise urging device. An operating member is provided that is disposed on the pivot arm and operationally interconnected with the gripping device. The operating member is arranged to move the gripping device against the pretension force to an open configuration and to also move the gripping device from the abutting configuration to a gripping configuration in which substantial gripping pressure is applied upon the cycle portion.

The beneficial effects described above apply generally to the exemplary devices and mechanisms disclosed herein of the cycle carrier assemblies. The specific structures through which these benefits are delivered will be described in detail hereinbelow.

BRIEF DESCRIPTION OF THE DRAWINGS

The invention will now be described in greater detail in the following way of example only and with reference to the attached drawings, in which.

MODE(S) FOR CARRYING OUT THE INVENTION

As required, detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a basis for the claims and as a representative basis for teaching one skilled in the art to variously employ the present invention.

Figure 1:
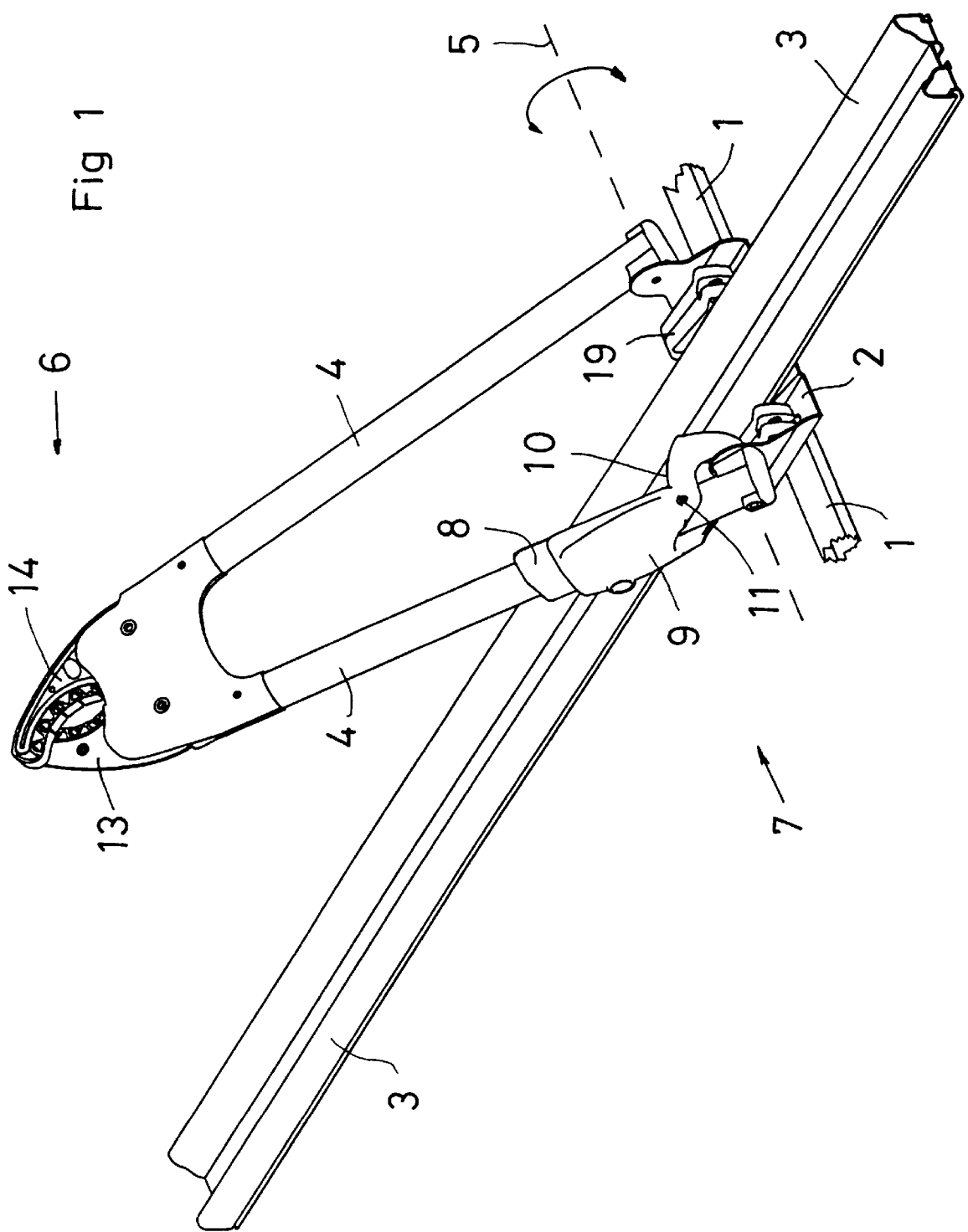
FIG. 1 shows the cycle carrier according to the present invention in the closed position.
Figure 2:
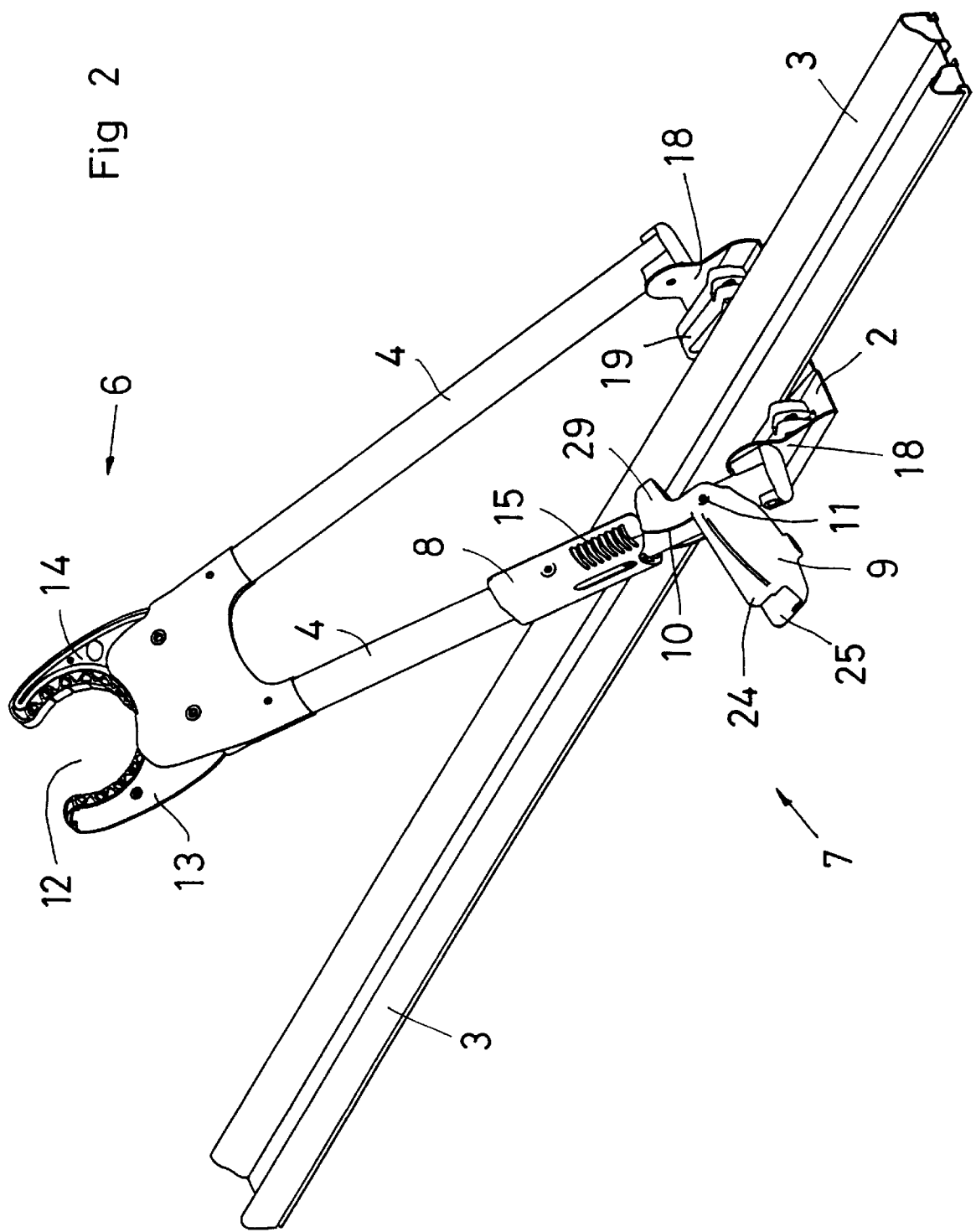
FIG. 2 shows the cycle carrier according to the present invention in the open position.

FIGS. 1 and 2 show a cycle carrier according to the present invention in one version which is intended for mounting on a load carrier with a pair of load carrier struts across a vehicle roof. Embodiments are also conceivable in which the cycle carrier is mounted on the rear end of the vehicle, for example via an adapter, on its drawbar ball or similar receiver.

In the Figures, reference numeral 1 relates to a load carrier strut which is included in a load carrier or roof rack and is disposed over a vehicle roof from its one side to the other and transversely of the direction of travel of the vehicle. The cycle carrier includes a retainer device 2 which is employed for mounting the cycle carrier on the load carrier strut.

The retainer device is connected to a rail 3 of channel-shaped profile, which is disposed approximately horizontally in the longitudinal direction of the vehicle. The rail 3 extends in the longitudinal direction of the vehicle and rests at its distal end in FIGS. 1 and 2 on a further load carrier strut (not shown). The purpose of the rail 3 is to carry and laterally positionally fix at least one of the wheels of the cycle which is carried by the cycle carrier.

An arm or a yoke 4 is pivotally secured in the retainer device 2 and is pivotal in accordance with the double-headed arrow about a broken line 5 from a downwardly pivoted position along the rail 3 to an upwardly pivoted position for cooperation with a portion of a cycle. The term "portion" is here principally taken to signify a section of a frame tube included in the frame of the cycle. In this context, the word "portion" should, however, be given a broader meaning so as also to encompass, for example, the cycle's handlebars, a pedal, a crank arm, a part of the saddle of the cycle or a luggage pannier, or an adapter specifically mounted on the cycle. Hereafter, the term "portion" will, however, be exemplified by a frame tube or a section of such a tube.

Figure 6:
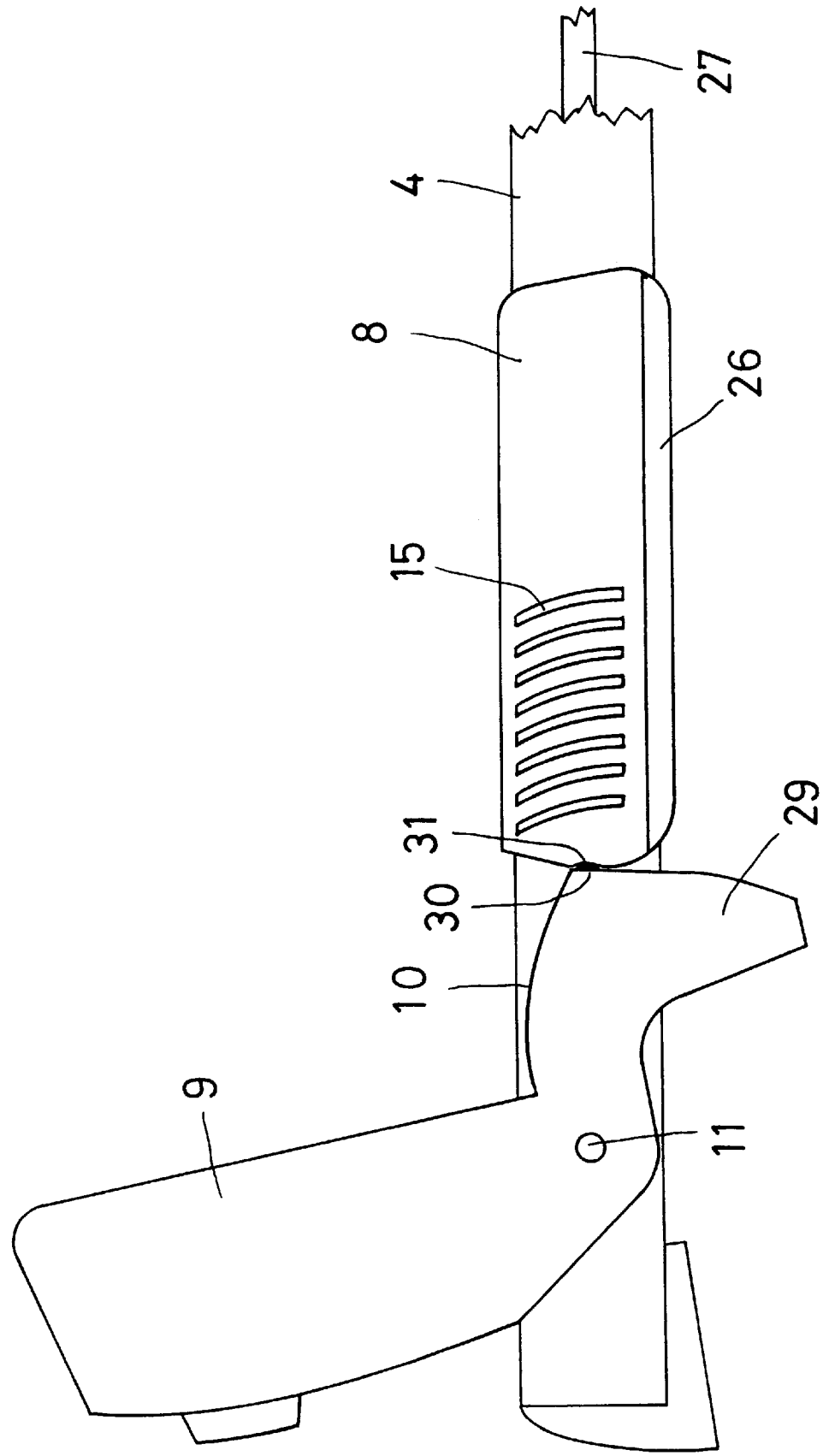
FIG. 6 is a view corresponding to that of FIG. 5, the opening position of the operating device having been reached.

In the upper end, the arm 4 has a gripping device 6 which, in FIG. 1, is shown in the closed position and, in FIG. 2, is shown in the open position for insertion or removal of a cycle. The gripping device 6 is maneuverable between the positions illustrated in FIGS. 1 and 2 by means of an operating device 7 which, in FIG. 1, is shown in the closed position and, in FIGS. 2 and 6, is shown in the open position.

The operating device 7 includes an operating member 8 which is movable in the longitudinal direction of the arm 4 towards and away from the gripping device 6. The operating member 8 is motionally interconnected with the gripping device in such a manner that, on displacement of the operating member 8 in a direction towards the gripping device, this is opened from the position illustrated in FIG. 1 to that illustrated in FIG. 2, and vice versa. Furthermore, a certain position of the operating member 8 will always have a corresponding position in the gripping device 6.

The operating device further includes a clamping member 9 which is pivotally disposed about a pivotal axis 11 transverse in relation to the longitudinal direction of the arm 4, between the positions illustrated in FIGS. 1 and 2.

A spring tensioning is connected to the gripping device 6, the operating member 8 or a linkage system (the connecting rod 27 in FIGS. 3–8) which motionally interconnects the gripping device and the operating member to one another and which strives to close the gripping device from the open position illustrated in FIG. 2 to the closed position illustrated in FIG. 1.

As was mentioned above, the operating member 8 and the gripping device 6 are motionally interconnected to one another such that a certain opening position of the gripping device always has its counterpart in the same position of the operating member 8 in the longitudinal direction of the arm 4. This implies that, in the closed position of the gripping device illustrated in FIG. 1, the operating member 8 is located at its furthest distance away from the gripping device, while it is moved to its position most proximal the gripping device in FIG. 2, where the gripping device is fully open.

The clamping member 9 has a cam curve 10 which, on pivoting of the clamping member 9 in a counterclockwise direction about the axis 11, displaces the operating member 8 in a direction upwards towards the gripping device 6. On complete pivoting of the clamping member 9 in a counterclockwise direction (approx. ¼ of a turn), the clamping member has arrived at the fully open position shown in FIG. 2 (see also FIG. 6), where the clamping member 9 blocks the possibility of the operating member 8 to return in a downward direction (in the closing direction of the gripping device) under the action of the spring pretensioning.

If, in the position according to FIG. 2, a portion of a cycle, e.g. a frame tube included in the frame of the cycle, is placed in the accommodation space 12 of the gripping device 6 (it being here presupposed that the relevant portion of the cycle is of smaller cross-sectional dimensions than the accommodation space), the operating member will, on partial return pivoting of the clamping member 9 in a clockwise direction so that the operating member 8 is released, be moved in a downward direction under the action of the spring pretensioning, which implies that both jaws 13 and 14 of the gripping device are pivoted towards one another until, under the action of the spring pretensioning, they abut against the gripped portion. In this position, the jaws 13 and 14 will be located in an intermediate position between that shown in FIG. 2 and that shown in FIG. 1. In such instance, the gripping device 6 and the operating member 8 are located in a starting position for fixedly locking the cycle frame, i.e. in an abutment position, which is determined by the dimensions of the gripped frame portion. This abutment position may, as regards the operating member 8, be located anywhere between those positions illustrated in FIGS. 1 and 2, where FIG. 2 shows the uppermost position of the operating member 8, while FIG. 1 shows its lowermost position.

In the abutment position, the gripping device has adjusted itself in response to the dimensions of the gripped frame portion so that no setting or adjustment need be carried out manually. From this starting position for fixedly locking the gripped frame portion, that is the abutment position, the gripped frame portion is then fixedly clamped in a positionally fixing manner when the operating member 8 is, under the action of the clamping member 9, displaced a short distance in a direction towards the lower end position illustrated in FIG. 1. In this context, the term "short" is taken to signify that the distance which is required for fixedly locking the gripped frame portion should be slight in relation to the maximum movement range of the operating member 8.

In order to accomplish this fixed clamping of the gripped frame portion, the operating member has means for transferring the gripping device to the clamping position, where the gripped frame portion is positionally fixedly clamped in the gripping device 6 regardless of where the abutment position was located, i.e. regardless of the vertical position of the operating member 8.

The means for transferring the gripping device to the clamping position comprises a series of devices on the operating member or clamping member, where closely adjacent devices in the above-intended meaning are in short spaced apart relationship. Further, a clamping arrangement is included which, by cooperation with a short portion of the series on its activation is operative, by a relative, short movement between the operating member 8 and the clamping member 9, to transfer the gripping device to the clamping position. As illustrated, the short portion of the series is located in the longitudinal direction of the series and is determined by the position of the gripping device in the abutment position, i.e. by the dimension of the gripped frame portion.

Figure 7:
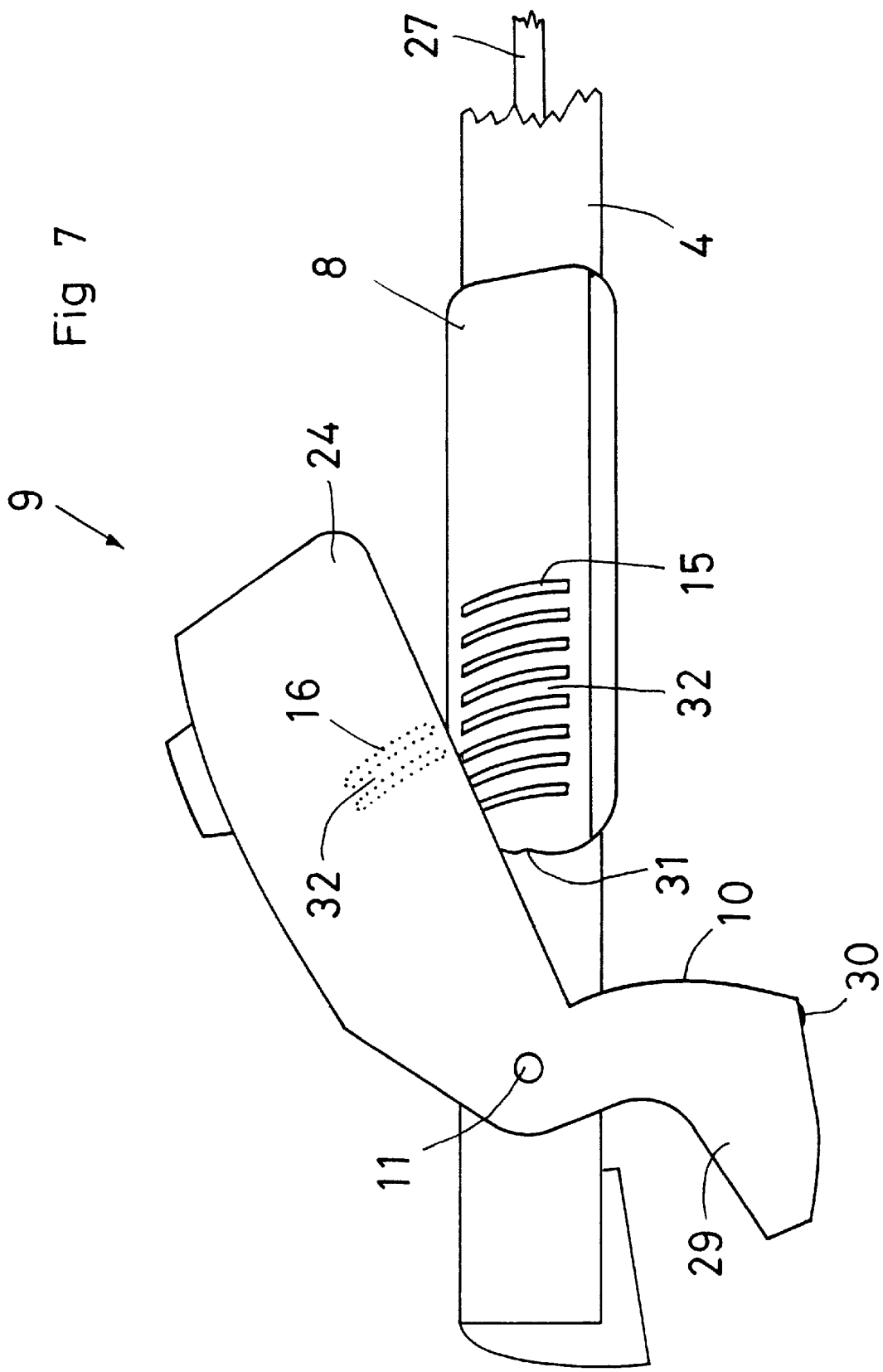
FIG. 7 is a view corresponding to that of FIG. 6, a portion of a cycle frame being located in the gripping device of the cycle carrier and the operating device having been returned to a starting position for locking (abutment position)

In more concrete terms, the means for transferring the gripping device (and the operating member 8) to the clamping position where the gripped frame portion is positionally fixedly clamped between the two jaws 13 and 14, consist of a series of engagement devices 15 on the operating member and at least one engagement device 16 on the clamping member 9, or vice versa (see FIG. 7). The engagement device of the clamping member 9 is disposed to engage with one or a couple of the engagement devices included in the series 15, where the position in the longitudinal direction along the arm 4 for the operating member 8 determines which engagement device or devices in the series will enter into function. On bringing together of the engagement devices 15 and 16 by pivoting the clamping member 9 in the clockwise direction, the engagement devices are disposed to cause a displacement of the operating member 8 in a downward direction a short distance. Also in this context, the term "short distance" is taken to mean a distance which is slight in relation to the maximum movement range of the operating member 8.

Figure 3:
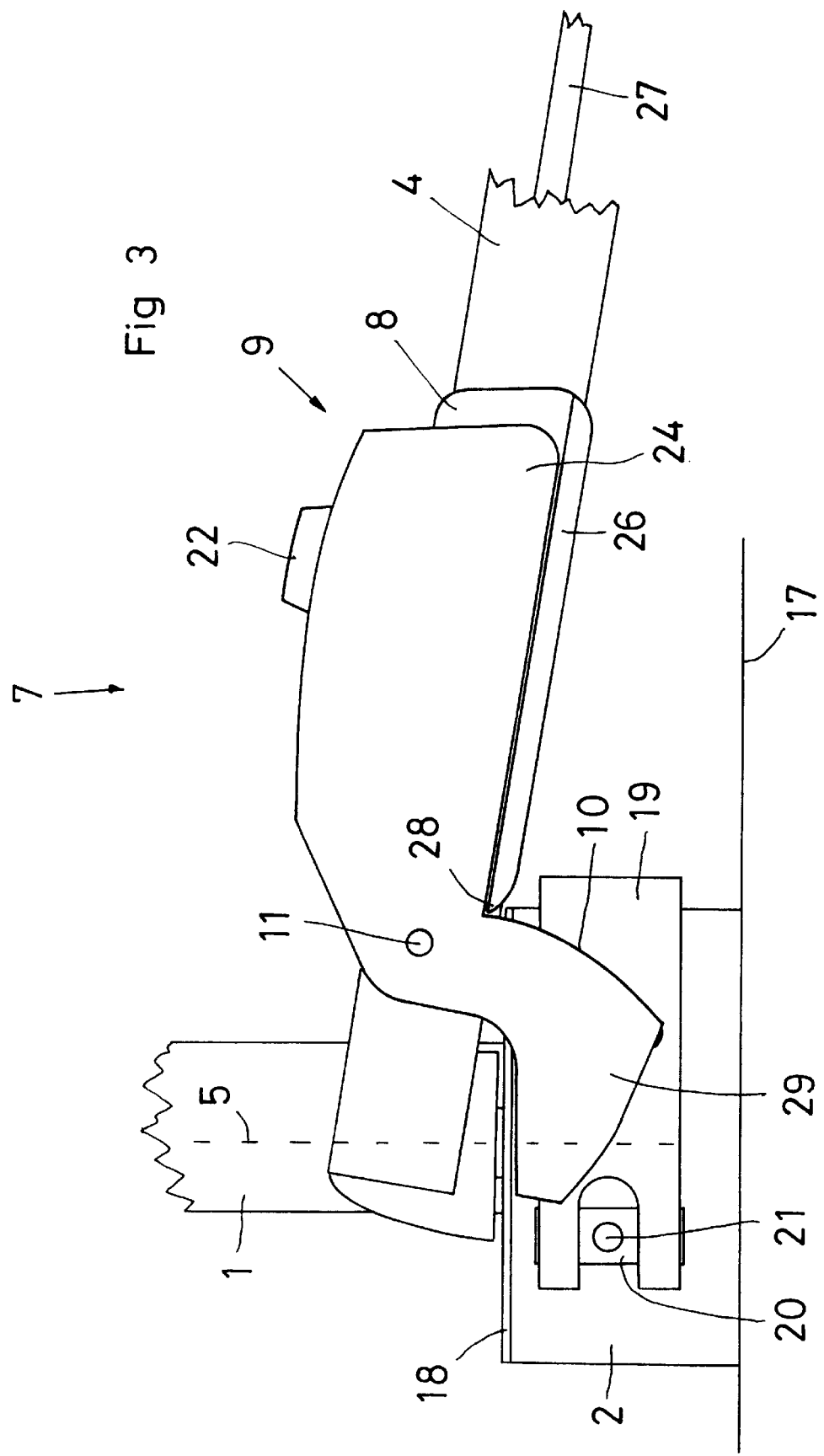
FIG. 3 is a partial view of the cycle carrier of FIGS. 1 and 2, with the gripping device of the cycle carrier empty and the operating device in the clamping position.

FIG. 3 shows a lower end portion of the arm 4 which is provided with the operating device 7. The Figure shows a view straight from above and it will be apparent from the Figure that the retainer device 2 is located on the upper side of the load carrier strut 1. The line 17 refers to an edge line on the rail 3. Analogous with that which applies in FIG. 1, the broken line 5 indicates the pivot axis about which the arm 4 is pivotal.

Taken as a whole, it will be apparent from FIGS. 1–3 that the retainer device 2 has a planar bottom plate which rests on the upper side of the load carrier strut 1 and at whose opposing ends upwardly directed anchorage lugs 18 are disposed. The anchorage lugs 18 serve for the pivotal securing of the arm 4.

For securing the cycle carrier on the load carrier strut 1, use is made in the illustrated embodiment of an excenter lock with a pivotal operating handle 19. In FIG. 3, the handle is located in the locked position and connects to the bottom plate of the retainer device 2. The handle has a rotary bolt 20 through which extends one shank of a clamp or the like which, on the under side of the retainer device 2, surrounds the load carrier strut 1 and fixedly clamps the retainer device 2 against the load carrier strut 1.

In FIG. 3, the gripping device 6 in the upper end of the arm 4 is closed in the same manner as shown in FIG. 1. Furthermore, the clamping member 9 is in the locked position where, with the aid of a lock 22 it may be fixedly locked in the operating member 8.

The operating member 8 has two mutually approximately parallel sides which are also approximately parallel with the plane of the paper in FIG. 3. The clamping member 9 is designed in order, in the position according to FIG. 3, to surround the operating member 8 and has, for this reason, two mutually spaced apart shanks 24 and 25 (see FIG. 2) between which the operating member 8 may be accommodated. Furthermore, the operating member 8 has projecting strip or bead portions 26 against which the edge lines of the shanks 24 and 25 abut in the position, according to FIG. 3. Other types of arrest means may also be provided for preventing the pivoting of the clamping member 9 in a clockwise direction past the position illustrated in FIG. 3. Such arrest means may be provided interiorly between the shanks 24 and 25.

FIG. 3 further illustrates a connecting rod 27 which, in the above-described manner, motionally interconnects the operating member 8 and the gripping device 6.

As was mentioned above, FIG. 3 illustrates the position which the components assume in the closed position of the gripping device 6. It will be apparent from the Figure that the cam curve 10 on the clamping member 9 is located in the immediate proximity of or abuts against end portions 28 of the strip or bead portions 26, this under the action of the spring pretensioning. It will further be apparent from the Figure that the projection 29 which supports the cam curve 10 in the position according to FIG. 3 blocks the handle 19 so that this cannot be pivoted up from the retainer device 2 and thereby release it from the load carrier strut 1.

Figure 4:
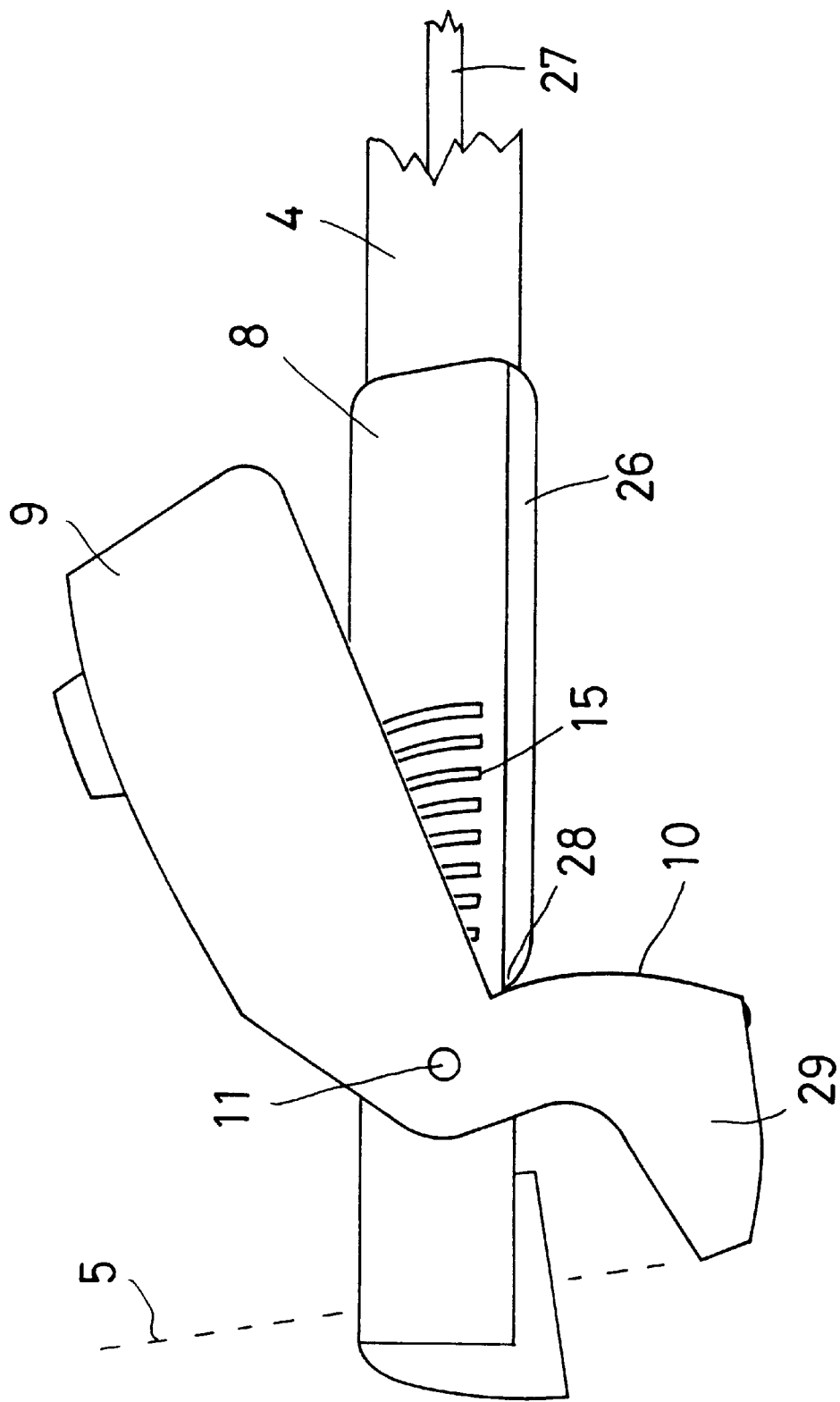
FIG. 4 is a view corresponding to that of FIG. 3, the operating device being located in the initial stage of an opening movement.
Figure 5:
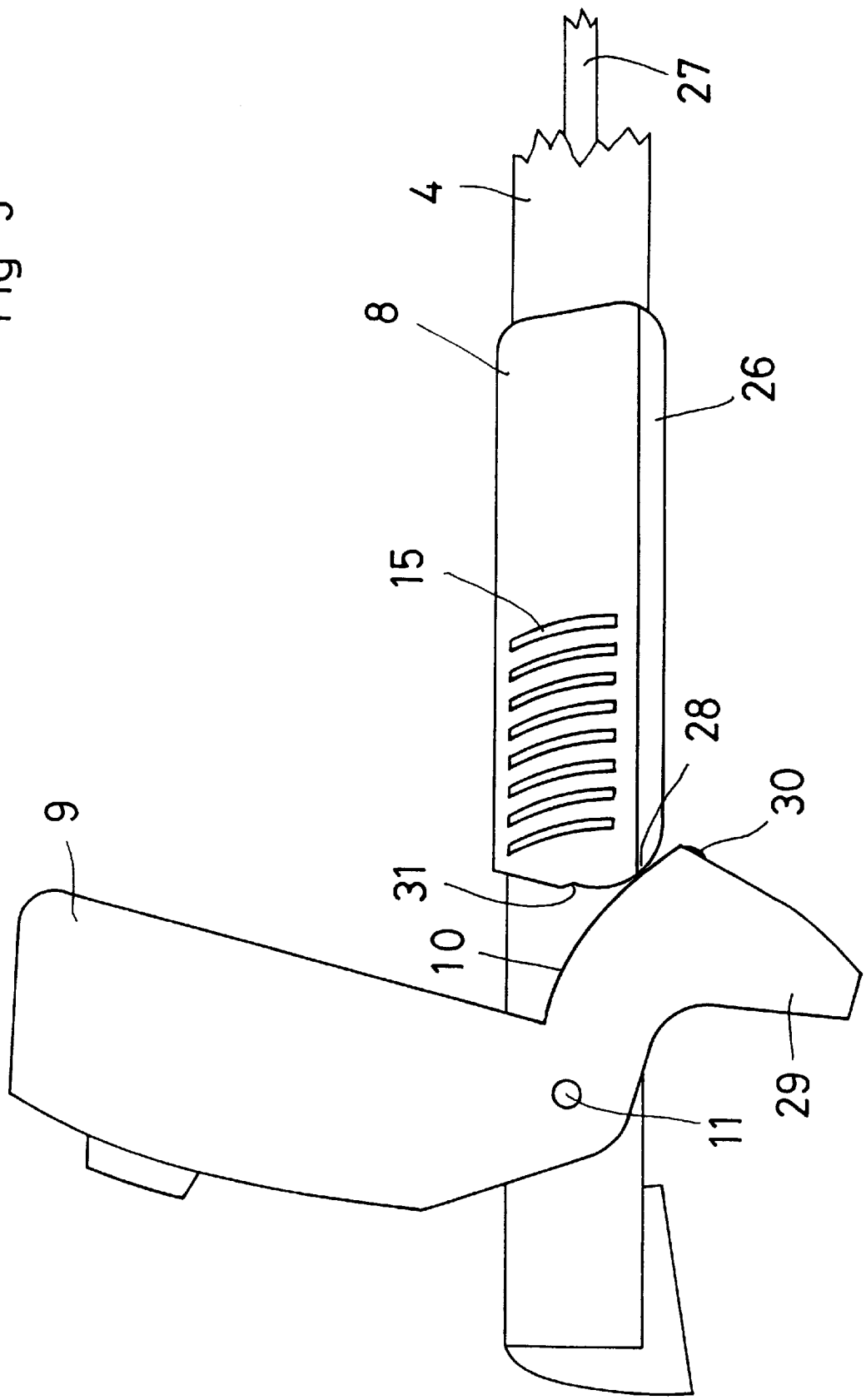
FIG. 5 is a view corresponding to that of FIG. 4, the opening movement of the operating device having proceeded a distance.

In FIG. 4, the clamping member 9 has been pivoted a short distance in the counterclockwise direction compared with the position shown in FIG. 3. In this position, the cam curve 10 abuts against the end portion 28 and a further counterclockwise pivoting of the clamping member 9 will result in the cam curve 10 displacing the operating member 8 in a direction to the right in FIG. 4. Such a pivoting position is shown in FIG. 5. The displacement of the operating member 8 constantly takes place under the action of the pivoting of the clamping member 9 against the spring pretensioning, at the same time as the gripping device 6 is gradually transferred from the position shown in FIG. 1 to the position illustrated in FIG. 2, i.e. the gripping device is opened.

In FIG. 6, the clamping member 9 has been pivoted to its maximum in the counterclockwise direction, for which reason the gripping device 6 is in the open position illustrated in FIG. 2. The pivoting of the clamping member 9 amounts to slightly more than one-quarter of a turn.

In FIG. 6, the operating member 8 has been displaced to a maximum extent in the direction to the right in the Figure, i.e. in an upward direction towards the gripping device 6. In this position, the clamping member 9 and the operating member 8 are locked, in that a projection 30 on the clamping member 9 is accommodated in a corresponding recess 31 in the end surface of the operating member 8. In this position, the operating device is thus open and locked against the spring pretensioning so that a cycle frame may simply and without risk be inserted in the wide-open gripping device.

Once the cycle frame has been placed in the open gripping device, the clamping member 9 is return pivoted in a clockwise direction so that the engagement between the projection 30 and the recess 31 is released. The spring pretensioning now closes the gripping device 6 and thereby the operating member 8 is also displaced to the left in the Figure, i.e. downwards and away from the gripping device 6. In FIG. 7, the gripping device has been closed under the action of the spring pretensioning so that both jaws 13 and 14 of the gripping device abut against the frame tube of the cycle in a preparatory position for fixedly locking it.

FIG. 7 clearly shows a series of engagement devices 15 disposed on the substantially parallel, opposing sides of the operating member 8. Further, dashed or ghosted lines show two engagement devices 16 on the inside of the one shank 24 of the clamping member 9. In a practical embodiment of the present invention, both of the shanks 24 and 25 on the clamping member 9 are provided with engagement devices 16 and, in a corresponding manner, the operating member 8 also has a series or set of engagement devices 15 on its opposing sides. Both the engagement devices 15 and 16 are, in the illustrated embodiment, designed as projecting strips or beads with interjacent grooves 32. The dimension of the strips or beads and the grooves is such that the engagement devices 15 and 16 may be moved into corresponding interjacent recesses 32 on pivoting of the clamping member 9 from the position illustrated in FIG. 7 to a locked position according to FIGS. 3 or 8. The projections 15 and 16 are, as is apparent from FIG. 7, somewhat curved, approximately as an arc of a circle with the stub shaft 11 as the center, but are, in addition, obliquely inclined or have a pitch which results in the operating member 8 being displaced a short distance to the left in FIG. 7 by the closing engagement of the members 16 upon the device 15, i.e. downwards and in the closing direction of the gripping device 6 in FIGS. 1 and 2. Suitably, the size of this displacement of the operating member may amount to approximately the spacing between the engagement devices in the series 15, i.e. a distance which is short in comparison with the maximum movement range of the operating member 8.

It will be apparent from the foregoing that the position of the operating member 8 along the arm 4 depends upon the thickness of the frame tube portion which, under the action of the spring pretensioning, is accommodated in the gripping device 6. This implies that the engagement device 16 of the clamping member 9 may engage with, in principle, any of the engagement devices 15. In a thick frame tube portion, the left-hand engagement devices 15 in FIG. 7 will come into function, while, on the other hand, in a slim frame tube portion, the right-hand engagement devices 15 will come into function. The series 15 of engagement devices on the operating member 8 need, as a result, to be of a length which approximately corresponds to or slightly exceeds the length of the movement of the operating member along the arm 4.

Figure 8:
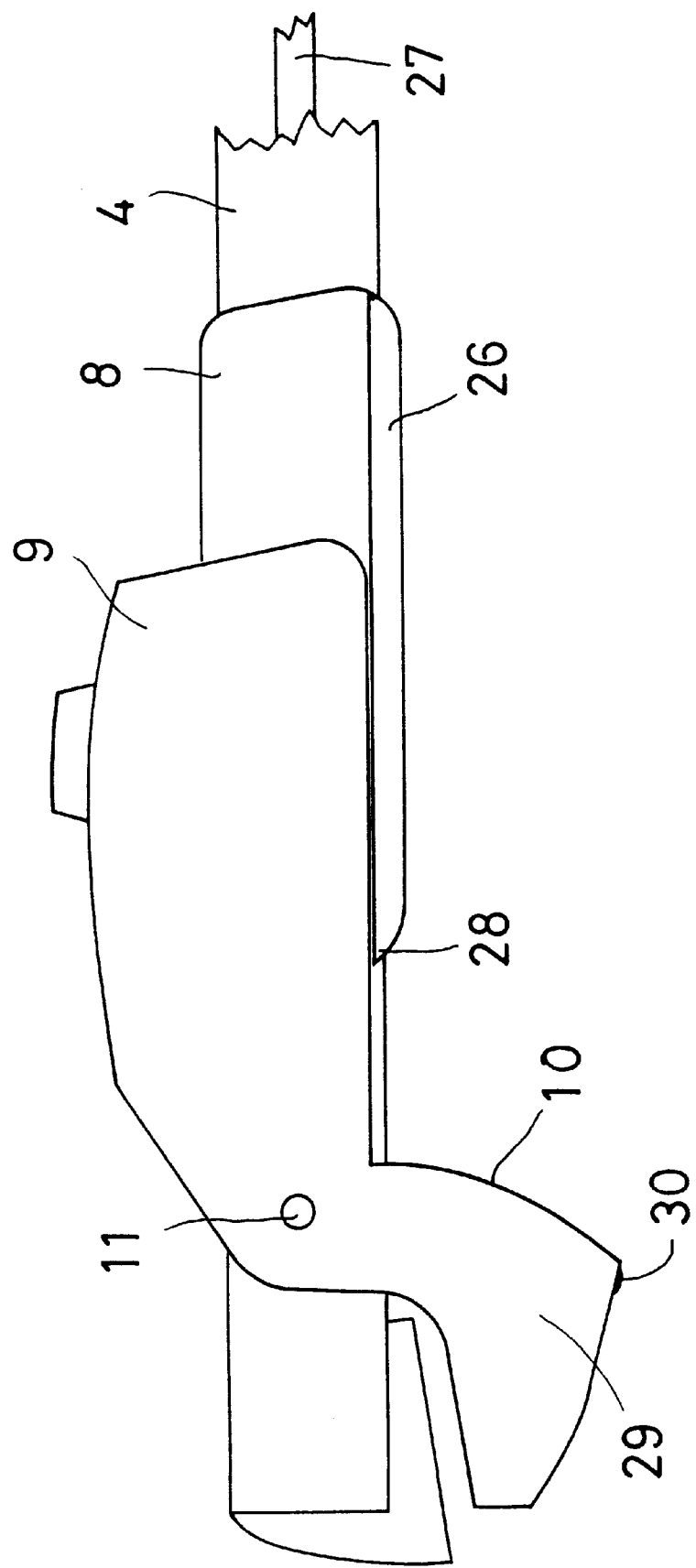
FIG. 8 is a view corresponding to that of FIG. 7, the operating device having been transferred to the clamping position.

FIG. 8 shows the locked position where the frame tube portion is positionally fixedly clamped in the gripping device 6. The longitudinal position of the operating member 8 along the arm 4 is somewhat displaced in a direction to the left in FIG. 8 compared with FIG. 7. The size of this displacement, which is positive, on the pivoting of the clamping member 9 from the position illustrated in FIG. 7 to the position illustrated in FIG. 8 amounts to approximately the spacing between the engagement devices 15. This short movement is sufficient in order, with the pre-setting which automatically occurs in the position according to FIG. 7, to achieve a reliable positionally fixing clamping of the frame tube portion. No adjustment in addition to that which automatically takes place under the action of the spring pretensioning is thus necessary. In a comparison between FIGS. 3 and 8, which both show a locked position, it will be clearly apparent that the operating member 8 is displaced to the right along the arm 4 in FIG. 8 compared with that which applies in FIG. 3. This displacement distance of the operating member corresponds to and is determined by the thickness of the gripped frame tube portion.

A cycle carrier and its components have been described herein. These and other variations which will be appreciated by those skilled in the art are within the intended scope of this invention as claimed below. As previously stated, detailed embodiments of the present invention are disclosed herein; however, it is to be understood that the disclosed embodiments are merely exemplary of the invention that may be embodied in various forms.

INDUSTRIAL APPLICABILITY

The present invention finds applicability in the vehicular cycle carrier industries.

What is claimed and desired to be secured by Letters Patent is as follows:

1. A cycle carrier having a gripping device for engagement with and positionally fixing retention of a portion of a cycle and an operating device for maneuvering the gripping device between a closed position and an open position, comprising:

said gripping device being openable against a spring pretensioning so that upon release, said spring pretensioning is disposed to transfer said gripping device to an abutment position against a gripped portion of a cycle that has been inserted into the open gripping device, the abutment position being dependent upon the thickness of the gripped portion;

said operating device includes engagement means for transferring said gripping device to a clamping position where the gripped portion is positionally fixedly clamped in the gripping device regardless of where the abutment position was located;

a movable operating member motionally interconnected with said gripping device for maneuvering said gripping device; a clamping member which, on activation, is disposed for transferring the operating member to or from positions which correspond to the clamping position and the abutment position of said gripping device; and said operating member has an engagement device which, for establishing said clamping position of said gripping device, is engageable in a corresponding engagement device on said clamping member, this latter engagement device being included in a series of engagement devices on said clamping member and being determined by the position of said operating member and thereby by the abutment position of said gripping device.

2. A cycle carrier having a gripping device for engagement with and positionally fixing retention of a portion of a cycle and an operating device for maneuvering the gripping device between a closed position and an open position, comprising:

said gripping device being openable against a spring pretensioning so that upon release, said spring pretensioning is disposed to transfer said gripping device to an abutment position against a gripped portion of a cycle that has been inserted into the open gripping device, the abutment position being dependent upon the thickness of the gripped portion;

said operating device includes engagement means for transferring said gripping device to a clamping position where the gripped portion is positionally fixedly clamped in the gripping device regardless of where the abutment position was located;

a movable operating member motionally interconnected with said gripping device for maneuvering said gripping device;

a clamping member which, on activation, is disposed for transferring the operating member to or from positions which correspond to the clamping position and the abutment position of said gripping device; and said clamping member has an engagement device which, for establishing said clamping position of said gripping device, is engageable with a corresponding engagement device on said operating member wherein said latter engagement device on said operating member is included in a series of engagement devices on said operating member and is determined by a position of said operating member and therefore by said abutment position of said gripping device.

3. The cycle carrier as recited in claim 2, wherein:

said gripping device is disposed at a free end of an arm of which an oppositely arranged pivot end of said arm is pivotally secured about a pivot axis in a retainer which is mounted on a load carrier strut secured over a vehicle roof, the pivot axis being substantially horizontal and transversely directed in relation to the direction of travel of the vehicle and said operating member is displaceable in the longitudinal direction of the arm and located proximate said opposite end; and said clamping member being pivotal about a pivot axis which is transverse in relation to said arm and is positioned between said operating member and said pivot end of said arm.

4. The cycle carrier as recited in claim 2, wherein:

said series of engagement devices is of a length which is considerably greater than the distance between adjacent engagement devices.

5. The cycle carrier as recited in claim 4, wherein:

said length of said series of engagement devices is five times greater than the distance between adjacent engagement devices.

6. The cycle carrier as recited in claim 4, wherein:

said length of said series of engagement devices is ten times greater than the distance between adjacent engagement devices.

7. The cycle carrier as recited in claim 3, further comprising:

said engagement device on said operating member includes a series of engagement devices having a number of elongate, slightly curved and approximately parallel strip-shaped projections which, therebetween, have groove-shaped recesses;

said engagement device of said clamping member, for cooperation with said series of engagement devices, includes at least one projection insertable in one of the groove-shaped recesses, said recess being selected based upon the abutment position; and said engagement devices of said series have a spacing therebetween resulting in a displacement of said operating member a short distance towards said clamping member when said clamping member is pivoted from a position corresponding to said abutment position to a position corresponding to said clamping position.

8. The cycle carrier as recited in claim 3, wherein:

said gripping device and its motional interconnection with said operating member is such that said gripping device is opened against the spring pretensioning when said operating member is displaced towards the gripping device.

9. The cycle carrier as recited in claim 3, wherein:

said gripping device and its motional interconnection with said operating member is such that said gripping device is moved toward a closed position when said spring pretensioning is released and said operating member is displaced away from the gripping device.

10. The cycle carrier as recited in claim 8, wherein:

said clamping member includes a cam curve that abuts against said operating member and which, on pivoting of said clamping member away from said clamping position, is disposed to displace said operating member towards said gripping device for opening said gripping device.

11. The cycle carrier as recited in claim 10, wherein:

a retainer is mounted on a load carrier by an anchorage device provided with a handle; and said cam curve is disposed on a projecting portion of the clamping member and said projecting portion of said clamping member is located in a position where said projecting portion blocks, in the opening direction, said handle of said anchorage device when said clamping member is located in a position corresponding to said clamping position.

12. The cycle carrier as recited in claim 2, wherein:

said clamping member has a locking device by which said clamping member is fixedly lockable in said operating member in the clamping position.

13. A cycle carrier having a gripping device for engagement with and positionally fixing retention of a portion of a cycle and an operating device for maneuvering the gripping device between a closed position and an open position, comprising:

said gripping device being openable against a spring pretensioning so that upon release, said spring pretensioning is disposed to transfer said gripping device to an abutment position against a gripped portion of a cycle that has been inserted into the open gripping device, the abutment position being dependent upon the thickness of the gripped portion;

said operating device includes engagement means for transferring said gripping device to a clamping position where the gripped portion is positionally fixedly clamped in the gripping device regardless of where the abutment position was located;

a movable operating member motionally interconnected with said gripping device for maneuvering said gripping device;

a clamping member which, on activation, is disposed for transferring the operating member to or from positions which correspond to the clamping position and the abutment position of said gripping device;

said operating member has two substantially parallel sides;

said clamping member has a recess defined by walls in which said operating member is accommodated; and said defining walls of said recess and said substantially parallel sides of said operating member have engagement devices.

14. A gripping arrangement for a cycle carrier for positionally fixing a cycle for transport or storage, said gripping arrangement comprising:

a gripping device disposed on a distal end of a pivot arm, said pivot arm arranged to pivot between a stored position and a cycle gripping position and said gripping device being pretensioned toward a cycle member abutting configuration;

an operating member disposed on said pivot arm and operationally interconnected with said gripping device, said operating member arranged to move said gripping device against said pretension to an open configuration and to move said gripping device to a gripping configuration from said abutting configuration;

a clamping member disposed at said arm, said clamping member arranged to move said operating member between open, abutting and clamping configurations;

said clamping member including, on an exterior surface thereof, a series of spaced-apart raised bead projections having interjacent grooves therebetween; and said clamping member having at least one opposingly oriented raised bead projection for insertion into at least one of said interjacent grooves for releasably fixing said operating member in said clamping configuration.

15. The cycle carrier as recited in claim 14, further comprising:

a cam surface engaged upon an end surface of said operating member for moving said operating member toward said open configuration.

16. The cycle carrier as recited in claim 15, further comprising:

said end surface of said operating member having a recess configured to matingly engage a projection carried upon said cam surface thereby releaseably fixing said gripping arrangement in said open configuration.

17. The cycle carrier as recited in claim 14, wherein:

said operating member is arranged to be movable from said abutting configuration to said clamping configuration by relative movement between said at least one opposingly oriented raised bead projection on said clamping member and said series of spaced-apart raised bead projections on said operating member.

18. The cycle carrier as recited in claim 14, wherein:

said operating member is arranged to be movable from said abutting configuration to said clamping configuration by sliding insertion of said at least one opposingly oriented raised bead projection on said clamping member into said series of spaced-apart raised bead projections on said operating member.

19. The cycle carrier as recited in claim 14, wherein:

said clamping member is pivotally coupled to said pivot arm.

20. The cycle carrier as recited in claim 14, wherein:

said gripping device is coupled between two pivot arms, said two pivot arms forming yoke distally terminating in said gripping device; and said gripping device is configured to releaseably engage a frame tube of a cycle.

21. A cycle carrier having a gripping device for engagement with and positionally fixing retention of a portion of a cycle and an operating device for maneuvering the gripping device between a closed position and an open position, comprising:

said gripping device being openable against a spring pretensioning so that upon release, said spring pretensioning is disposed to transfer said gripping device to an abutment position against a gripped portion of a cycle that has been inserted into the open gripping device, the abutment position being dependent upon the thickness of the gripped portion;

said operating device includes engagement means for transferring said gripping device to a clamping position where the gripped portion is positionally fixedly clamped in the gripping device regardless of where the abutment position was located;

a movable operating member motionally interconnected with said gripping device for maneuvering said gripping device;

a clamping member which, on activation, is disposed for transferring the operating member to or from positions which correspond to the clamping position and the abutment position of said gripping device;

said gripping device is disposed at a free end of an arm of which an oppositely arranged pivot end of said arm is pivotally secured about a pivot axis in a retainer which is mountable on a load carrier strut secured over a vehicle roof, the pivot axis being substantially horizontal and transversely directed in relation to a direction of travel of the vehicle and said operating member is displaceable in the longitudinal direction of the arm and located proximate said opposite end;

said clamping member being pivotal about a pivot axis which is transverse in relation to said arm and is positioned between said operating member and said pivot end of said arm;

a series of engagement devices on said operating member including a number of elongate, slightly curved and approximately parallel strip-shaped projections which, therebetween, have groove-shaped recesses;

engagement devices on said clamping member, for cooperation with said series of engagement devices on said operating member, including at least one projection insertable in one of the groove-shaped recesses, said recess being selected based upon the abutment position; and said series of engagement devices of said operating member having a spacing therebetween resulting in a displacement of said operating member a short distance towards said clamping member when said clamping member is pivoted from a position corresponding to said abutment position to a position corresponding to said clamping position.

22. A cycle carrier having a gripping device for engagement with and positionally fixing retention of a portion of a cycle and an operating device for maneuvering the gripping device between a closed position and an open position, comprising:

said gripping device being openable against a spring pretensioning so that upon release, said spring pretensioning is disposed to transfer said gripping device to an abutment position against a gripped portion of a cycle that has been inserted into the open gripping device, the abutment position being dependent upon the thickness of the gripped portion;

said operating device includes engagement means for transferring said gripping device to a clamping position where the gripped portion is positionally fixedly clamped in the gripping device regardless of where the abutment position was located;

a movable operating member motionally interconnected with said gripping device for maneuvering said gripping device;

a clamping member which, on activation, is disposed for transferring the operating member to or from positions which correspond to the clamping position and the abutment position of said gripping device;

said gripping device is disposed at a free end of an arm of which an oppositely arranged pivot end of said arm is pivotally secured about a pivot axis in a retainer which is mounted on a load carrier strut secured over a vehicle roof, the pivot axis being substantially horizontal and transversely directed in relation to the direction of travel of the vehicle and said operating member is displaceable in the longitudinal direction of the arm and located proximate said opposite end;

said clamping member being pivotal about a pivot axis which is transverse in relation to said arm and is positioned between said operating member and said pivot end of said arm;

said gripping device and its motional interconnection with said operating member is such that said gripping device is opened against the spring pretensioning when said operating member is displaced towards the gripping device;

said clamping member includes a cam curve that abuts against said operating member and which, on pivoting of said clamping member away from said clamping position, is disposed to displace said operating member towards said gripping device for opening said gripping device;

a retainer mountable on a load carrier by an anchorage device provided with a handle; and said cam curve is disposed on a projecting portion of the clamping member and said projecting portion of said clamping member is located in a position where said projecting portion blocks, in the opening direction, said handle of said anchorage device when said clamping member is located in a position corresponding to said clamping position.

* * * * *